(12) United States Patent
Enokida et al.

(10) Patent No.: US 6,335,746 B1
(45) Date of Patent: *Jan. 1, 2002

(54) INFORMATION PROCESSING METHOD AND APPARATUS FOR DISPLAYING A LIST OF A PLURALITY OF IMAGE DATA FILES AND A LIST OF SEARCH RESULTS

(75) Inventors: Miyuki Enokida, Yokohama (JP); Tadashi Yoshida, Irvine, CA (US); Kunihiro Yamamoto, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/899,055

(22) Filed: Jul. 23, 1997

(30) Foreign Application Priority Data

Jul. 26, 1996 (JP) ............................................. 8-197242

(51) Int. Cl.[7] ................................................. G06F 7/00
(52) U.S. Cl. ........................................ 345/839; 345/764
(58) Field of Search ................................. 345/326, 330, 345/332, 333, 334, 339, 340, 342, 345, 355, 356, 428, 348

(56) References Cited

U.S. PATENT DOCUMENTS

| | | | | |
|---|---|---|---|---|
| 5,491,795 A | * | 2/1996 | Beaudet et al. | 345/159 |
| 5,706,457 A | * | 1/1998 | Dwyer et al. | 345/349 |
| 5,731,813 A | * | 3/1998 | O'Rourke et al. | 345/349 |
| 5,761,686 A | * | 6/1998 | Bloomberg | 345/348 |
| 5,819,261 A | * | 10/1998 | Takahashi et al. | 707/3 |
| 6,005,679 A | * | 12/1999 | Haneda | 348/231 |

OTHER PUBLICATIONS

Microsoft Window NT 4 Workstation Jacquelyn Garron and Joseph Goran, 1996.*

* cited by examiner

Primary Examiner—Cao H. Nguyen
(74) Attorney, Agent, or Firm—Fitzpatrick, Cella, Harper & Scinto

(57) ABSTRACT

A file system has a hierarchical tree structure in which directories and files are placed under another directory. According to the hierarchical tree structure, the data of one image is assigned to one file and a group of image data is assigned a common directory name. A program for managing the image data displays a thumbnail image based upon the image data of each file that belongs to a desired directory. With regard to another directory that belongs to the desired directory, a display is presented to clearly indicate that this is a directory and a thumbnail image based upon the image data of one file among the files belonging to this other directory is displayed as well.

23 Claims, 11 Drawing Sheets

DIRECTORY STRUCTURE

```
DIR A
 |
 |
 +---- FILE1.jpg
 +---- FILE2.jpg
 +---- FILE3.jpg
 +--- DIR1
 |      |
 |      |
 |      +---- FILE7.jbg
 |      +---- FILE8.jbg
 |
 |
 |
 +---- FILE4.jpg
 +---- FILE5.jpg
 +---- FILE6.jpg
 +---- DIR2
          |
          |
          +---- FILE9.jbg
          +---- FILE10.jbg
```

FIG. 12

DIRECTORY DISPLAY PROCESSING
↓
OPEN DIRECTORY FILE, COUNT NUMBER OF FILES AND DISPLAY NUMBER — S90
↓
DISPLAY DIRECTORY ICON — S50
↓
DISPLAY DIRECTORY NAME — S54
↓
END

FIG. 13

| DIR – A / FILE1.jpg |
| DIR – A / FILE2.jpg |
| DIR – A / FILE4.jpg |
| DIR – A / DIR1 / FILE7.jbg |
| DIR – A / DIR2 / FILE9.jbg |
| DIR – A / DIR2 / FILE10.jbg |

INFORMATION PROCESSING METHOD AND APPARATUS FOR DISPLAYING A LIST OF A PLURALITY OF IMAGE DATA FILES AND A LIST OF SEARCH RESULTS

BACKGROUND OF THE INVENTION

This invention relates to an information processing method and apparatus and, more particularly, to an information processing method and apparatus for displaying a list of a plurality of image data files as well as a list of search results.

The recent rapid increase in the power of computers and in the storage capacity of magnetic disks and magneto-optical (MO) disks has led to the practical use of image filing systems and image databases for storing large quantities of image data.

In these systems, images usually are stored on a computer disk in the manner exemplified by FIG. 1, which will now be described.

Shown in FIG. 1 are an image scanner 10, a personal computer 20, a display 22 and a magnetic disk 30, which is built in the personal computer 20 or externally connected to the computer.

The scanner 10 reads an image using an internal image sensor (not shown), converts the image to a digital signal and then transmits the digital signal to the personal computer 20 via e.g. an SCSI interface (not shown) and a cable 11. The image digitized by the scanner 10 is a monochrome bi-level image, an 8-bit grayscale image or a 24-bit full-color image, etc., and is capable of being selected in accordance with the input image.

The digital image read by the personal computer 20 is given a file name and then is stored on the magnetic disk 30. A plurality of items of image data that have been stored on the magnetic disk 30 are read out and displayed on the display 22 by having their file names designated by the operator of the personal computer.

However, an image filing system of this kind has the following problems:

First, since the quantity of image data is very large, reading the designated image data out of the disk and displaying the image data take time. For example, in case of a 400-dpi monochrome bi-level image of size A4, the amount of data is approximately two megabytes. If the image is a full-color image, the amount of data is about 48 megabytes. As a consequence, a considerable period of time is required even to transmit the monochrome image via the interface (e.g. the SCSI and cable 21) between the personal computer and the disk. In case of the full-color image, the time required is much greater.

In general, image compression is carried out to solve this problem. For example, the JPEG compression method is used widely to compress full-color images. In accordance with the JPEG method, it is possible to compress image data to 1/20 to 1/30 of the original without much deterioration in image quality. However, even though the time for transmitting data from the disk to the personal computer is shortened when compression is carried out, processing for decoding the compressed image data by the personal computer is necessary. This means that considerable time is still required.

Second, in order to find a desired image among stored images (this is referred to as a manual search) or to verify the image, an enormous quantity of compressed image data must be read out of the disk, decoded and then displayed each time.

Further, the display 22 usually has a resolution which is low in comparison with that of the image data that has been stored on the disk 30. When an image is displayed, therefore, processing such as subsampling is required. Accordingly, in a situation where a stored image is manually searched or verified, it is required that each image file be displayed one at a time. This is extremely inefficient.

In order to improve upon these drawbacks, a filing system which performs a search using reduced images referred to as thumbnail images has been proposed. Such an example is illustrated in FIG. 2.

Numerals 20, 22 in FIG. 2 represent the personal computer 20 and display 22 shown in FIG. 1.

A reduced image (thumbnail image) is produced for each image file in advance and the thumbnail image is displayed instead of the stored image having the original dimensions. Since a thumbnail image has a smaller data size than the image of the original size, it is transmitted from the disk in a shorter period of time. An additional advantage is that a multiplicity of thumbnail images 23, 24, 25 can be displayed on the display 22 at one time.

Nevertheless, a system of this kind still has a number of disadvantages.

Specifically, since a thumbnail image per se is merely for the purpose of displaying the general features of the full-size image, it is desired that the thumbnail image be in the same file as that of the image of the full-size image. However, if a thumbnail image and the full-size image are included in one file, the file must have a special format and it will not be possible to read the file out of another application or from a filing system. In addition, if the number of stored images is large, problems arise in terms of the amount of data possessed by the thumbnail images.

On the other hand, if a thumbnail image and its full-size image are placed in separate files, management becomes more complicated.

In a case where a thumbnail image and its full-size image are placed in separate files, an application which manages filing must manage the correlation between the thumbnail image and full-size image. Consequently, when the user executes processing such as movement, copying, renaming or deletion of a file by the function of the operating system (OS) or by an application belonging to the OS, a contradiction occurs with respect to correlation with the filing application.

Another drawback is that a thumbnail image is produced arbitrarily as a file irrespective of the volition of the user. Furthermore, if the number of stored images is large, problems arise in terms of the amount of data possessed by the thumbnail images.

In order to prevent the occurrence of the above-mentioned contradiction in terms of the correlation between a full-size image file and its thumbnail image file, a filing system having a database structure has been proposed. With this database structure, there are many cases where a plurality of retrieved files are displayed as thumbnail images by performing a search among a number of image files using a keyword search or the like. In a database structure of this kind, image files are managed within the database structure and the file management structure is invisible to the user. For example, since the user cannot see the directory structure directly, a file which could not be retrieved as by a keyword search can only be retrieved by displaying files one after another. This is inconvenient. Further, even in a case where files having a directory structure are provided on a separate medium such as a CD-ROM, all images must be moved to a database area and a change must be made to a structure to which the thumbnail images have been added.

Thus, in the image filing system described above, the following drawbacks are encountered in a case where a manual search is performed to select a desired image from a plurality of images:

1. A long period of time is required to display image for the sake of verifying an image.
2. With an image search using thumbnail images, a special type of management is needed to manage the thumbnail images and full-size images and difficulties arise when processing the images from the OS or another application.
3. When there is a large number of filed images, problems arise in terms of the volume of data of the thumbnail images.
4. In an image filing system having a database structure, the structure cannot be seen by the user. As a result, inconveniences arise in a case where a desired image is retrieved while displaying and verifying images.
5. In an image filing system having a database sturcture, it is not possible for the user to manage image files disposed under a desired directory.
6. In order to perform an image search of another image file area having a directory structure, a change must be made to a database structure. Operation is complicated and processing takes too much time.

SUMMARY OF THE INVENTION

Accordingly, an object of the present invention is to provide an information processing method and apparatus in a file system having a hierarchical tree structure based upon directories, wherein it is possible to display thumbnail images of image data files in accordance with the tree structure.

By making it possible to present such an image data file display, the user can retrieve a desired image from a plurality of images simply and at high speed.

Another object of the present invention is to indicate image data files present in one directory by thumbnail images and, with regard to another directory which belongs to the first-mentioned directory, to indicate one image data file present in this other directory by a thumbnail image, thereby making it possible to readily ascertain whether an image data file is present in the other directory.

In accordance with an embodiment of the present invention, there is provided an information processing method for managing image data files by a file system having a hierarchical tree structure in which directories and files are placed under another directory, comprising a first generating step of generating a thumbnail image on the basis of each image data file that belongs to a desired directory, a first display step of displaying the thumbnail images generated at the first generating step, a second generating step of generating a thumbnail image on the basis of one image data file among image data files that belong to another directory belonging to the desired directory, and a second display step of displaying the thumbnail image generated at the second generating step.

In accordance with another embodiment of the present invention, there is provided an information processing apparatus for managing image data files by a file system having a hierarchical tree structure in which directories and files are placed under another directory, comprising first generating means for generating a thumbnail image on the basis of each image data file that belongs to a desired directory, first display means for displaying the thumbnail images generated by the first generating means, second generating means for generating a thumbnail image on the basis of one image data file among image data files that belong to another directory belonging to the desired directory, and second display means for displaying the thumbnail image generated by the second generating means.

A further object of the present invention is to decode, over a plurality of stages, coded image data capable of being decoded at multiple levels, whereby it is possible to discover, at a low-level decoding stage, whether an image is a desired image, thereby raising the efficiency of image retrieval.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a flowchart illustrating directory display processing according to a third embodiment of the invention;

FIG. 13 is a conceptual view showing an example of the results of a search according to the third embodiment;

DESCRIPTION OF THE PREFERRED EMBODIMENTS

Preferred embodiments of the present invention will now be described in detail in accordance with the accompanying drawings.

According to the information processing method of this embodiment of the present invention, image data is managed through a directory structure possessed by a file system, and one item of image data is managed by one file, whereby a desired image is retrieved/displayed in accordance with a directory structure.

In relation to display of directories and image files disposed under a single directory, one thumbnail image among image files belonging to a directory is selected and displayed. With regard to image files, the thumbnail images thereof are generated and displayed. This makes it possible to realize a faster image search.

Further, processing is executed to obtain a detailed image by displaying a list of image files disposed under a selected directory and selecting one file from the list of image files.

An information processing method and apparatus according to embodiments of the invention will now be described in detail.

[First Embodiment]

Figures 3, 4:
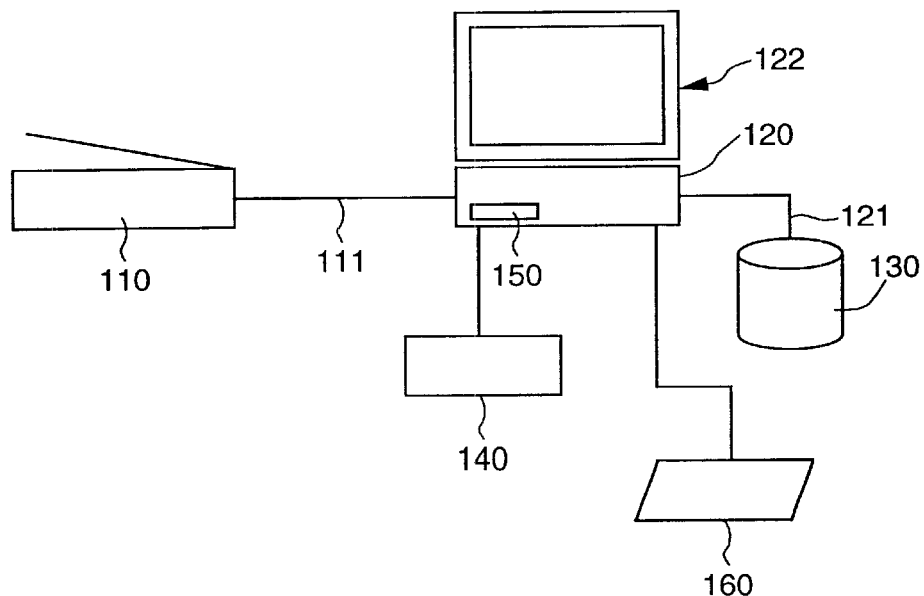
FIG. 3 is a diagram showing the configuration of an information processing apparatus according to a first embodiment of the present invention.
FIG. 4 is a conceptual view showing a directory structure according to the first embodiment.

FIG. 3 illustrates the configuration of an information processing apparatus according to a first embodiment of the present invention. The apparatus includes an image scanner 110, a personal computer 120, a display 122 and a magnetic disk 130. The magnetic disk 130, which may be built in the personal computer 120 or externally connected to the computer.

Figure 16:
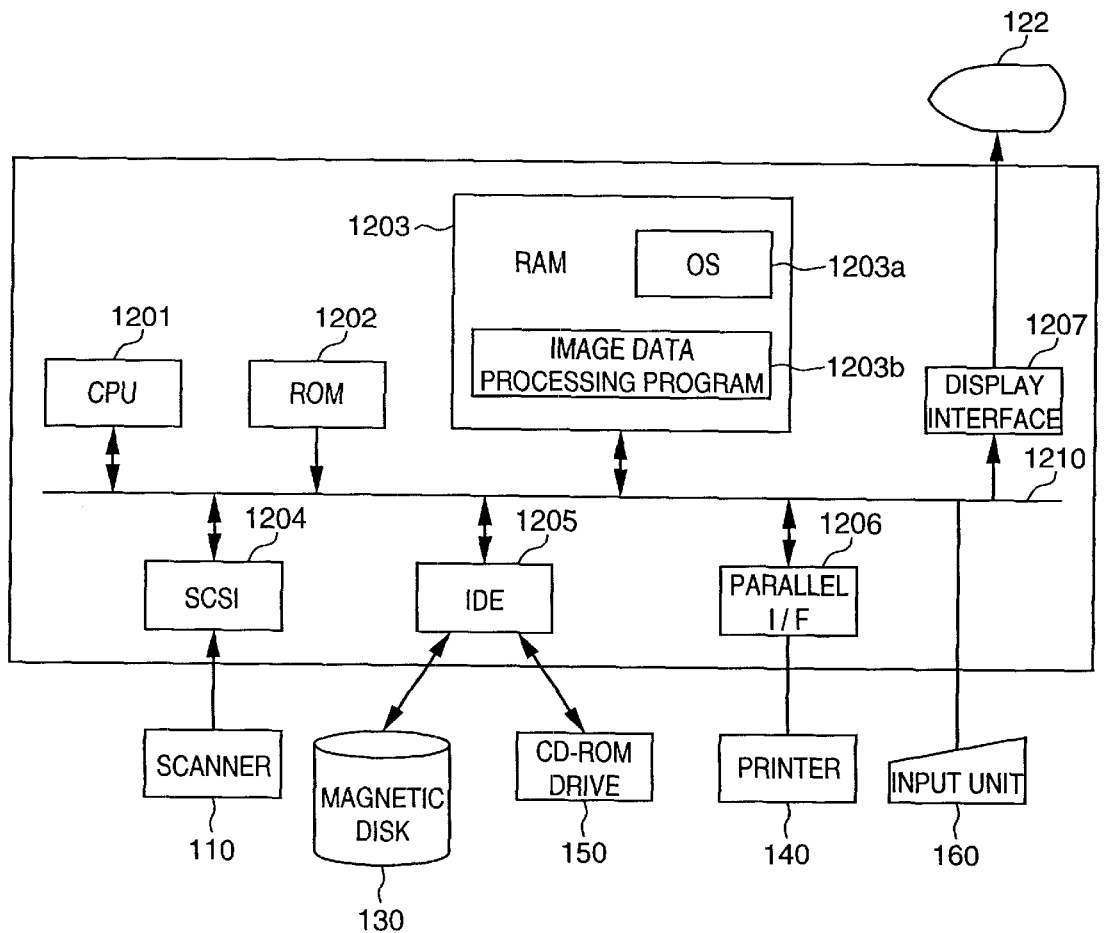
FIG. 16 is a block diagram illustrating the construction of an information processing apparatus according to this embodiment.

FIG. 16 is a block diagram illustrating the construction of the information processing system according to this embodiment. The personal computer 120 includes a CPU 1201 for executing various control operations based upon control programs stored in a ROM 1202 or RAM 1203. The ROM 1202 stores programs such as a booting program and various data. The RAM 1203 stores various control programs downloaded from the magnetic disk 130. An operating system 1203*a* includes a file management system having a hierarchical tree structure. An image data management program 1203*b* implements control indicated by various flowcharts described below.

The personal computer 120 further includes an SCSI interface 1204 to which the scanner 110 is connected in this embodiment, an IDE interface 1205 to which the magnetic disk 130 or CD-ROM 150 is connected, a parallel interface 1206 to which a printer 140 is connected, a display interface 1207 to which the display 122 is connected, and a system bus 1210 which interconnects the components mentioned above.

The scanner 110 reads an image, converts the image data to a digital signal and then transmits the digital signal to the personal computer 120 by, say, the SCSI interface 1204 via a cable 111. The image digitized by the scanner 110 is a monochrome bi-level image, an 8-bit grayscale image or a 24-bit full-color image, etc., and is capable of being selected in accordance with the type of input image.

The digital image read by the personal computer 120 is given a file name and then is stored on the magnetic disk 130. A plurality of items of image data that have been stored on the magnetic disk 130 are read out and displayed on the display 122 of the personal computer by having their file names designated by the operator of the personal computer.

The system of FIG. 16 further includes a color printer 140, a CD-ROM drive 150 and an input unit 160 including a keyboard and a pointing device.

Figure 1:
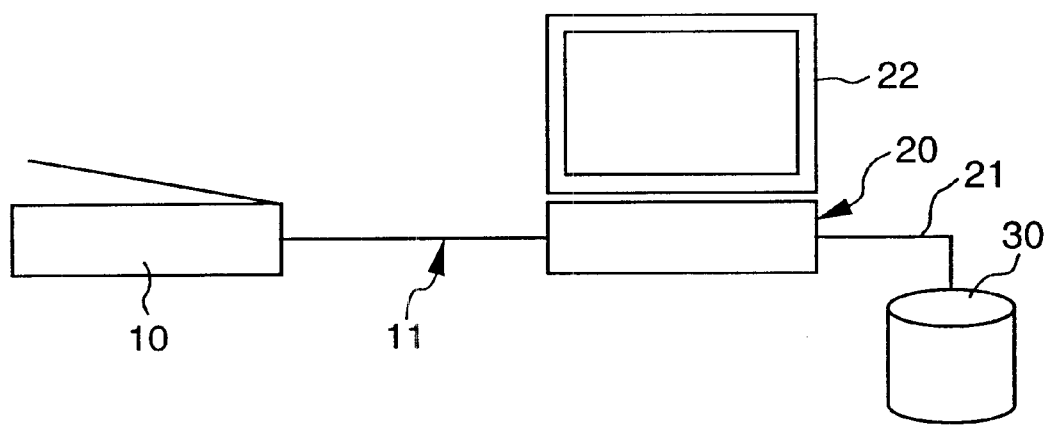
FIG. 1 is a diagram showing the configuration of an ordinary apparatus which implements image data management.
Figure 2:
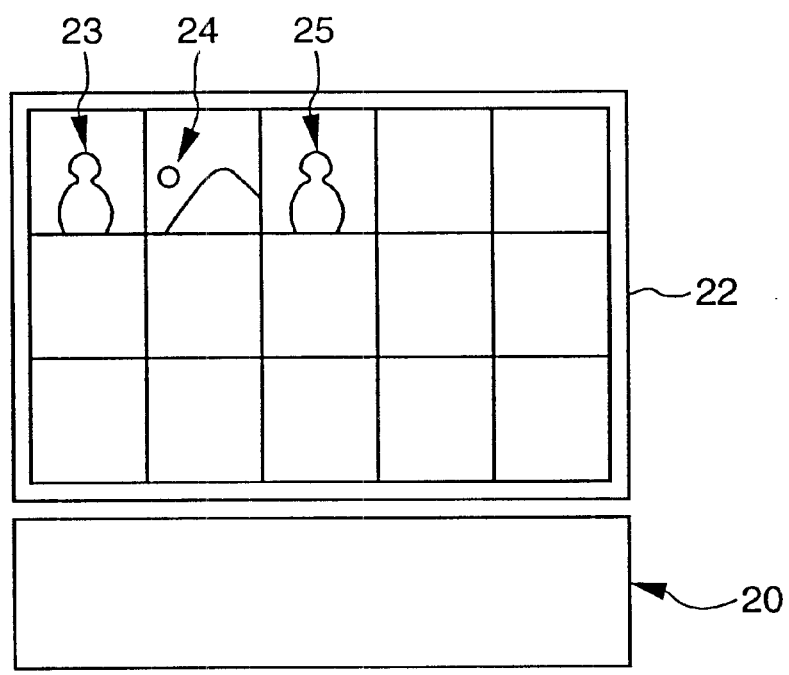
FIG. 2 is a diagram showing an example of a display of ordinary thumbnail images.

According to this embodiment, an image is read and digitized by the scanner 110 and compressed by the personal computer 120, after which the compressed data is stored on the magnetic disk 130, in the same manner as in the arrangement of FIG. 1. However, images and files are in one-to-one correspondence and the system is not provided with thumbnail images in advance.

Further, according to this embodiment, JPEG compression is used to compress color images and JBIG compression is used to compress bi-level images. Here an extension jpg is attached to the file name of a color image compressed by JPEG compression to give file name .jpg and an extension jbg is attached to the file name of a bi-level image compressed by JBIG compression to give file name.jbg In this embodiment, a DOS/Windows system, for example, is implemented as the operating system 1203*a* (FIG. 16) and files are managed according to the names "FILE1.jpg", "FILE2.jbg", . . .

in one-image, one-file units under the ordinary DOS directory structure.

An example of such file management is illustrated in FIG. 4. In this embodiment, by way of example, retrieval and display of filed images managed in accordance with the file directory structure of the kind shown in FIG. 4 is carried out.

For instance, color images that have been read in by the scanner 110 are named in the manner FILE1.jpg, . . . , FILE6.jpg these are subjected to JPEG compression and then the compressed images are stored according to the directory structure shown in FIG. 4. Bi-level images are named in the manner FILE7.jbg, . . . , FILE10.jbg these are subjected to JBIG compression and then the compressed images are stored on the magnetic disk 130.

In the directory structure of FIG. 4, image files from FILE1.jpg to FILE6.jpg and two directories "DIR-1", "DIR-2" exist under the directory name "DIR-A".

Further, FILE7.jbg, FILE8.jbg belong to the directory name "DIR-1", and two image files FILE9.jbg, FILE10.jbg are present in the directory name "DIR-2".

Figure 5:
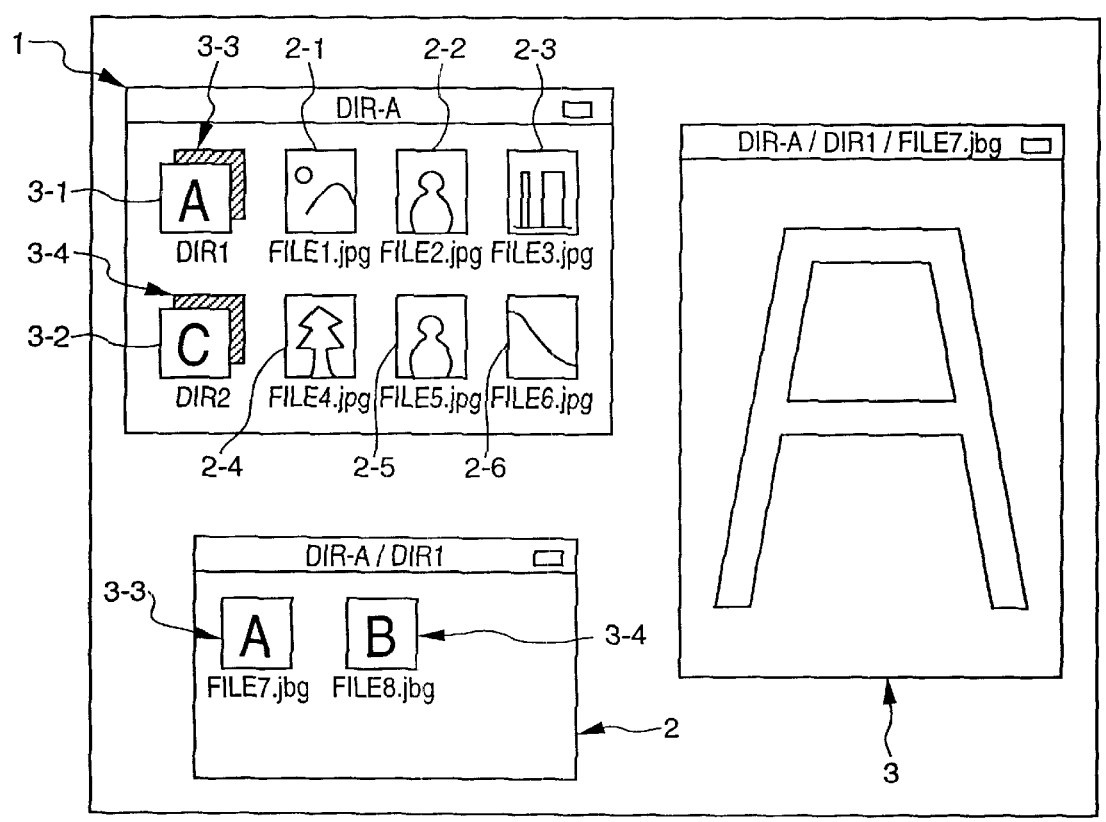
FIG. 5 is a diagram showing an example of a display in image file retrieval processing.

The image data management program 1203*b* retrieves image files stored in the manner described above and displays these image files in the manner shown in FIG. 5. In FIG. 5, windows 1, 2, 3 display the retrieved images. Each directory belonging to the directory name DIR-A shown in FIG. 4 and information relating to the image files are displayed in the window 1. Windows from 2-1 to 2-6 indicate image displays (referred to as "icon images" below) that correspond to the file names of the file images belonging to the directory DIR-A. Further, windows 3-1 and 3-2 indicate examples of icon images of the directories that belong to the directory DIR-A. Processing for displaying the files under the directory name "DIR-A) of FIG. 4 (processing of the image data management program 1203*b*) will be described with reference to the flowcharts of FIGS. 6 and 7.

With regard to the relationship between the extension and coding method of image data handled, a case in which a monochrome bi-level image, namely the extension thereof, is ".jbg", indicates that the data is coded data hierarchically coded by the JBIG method, and a case in which a color image or monochrome multiple-bit image, namely the extension thereof, is ".jpg", indicates that the data is coded data coded by the JPEG method.

The thumbnail images of FILE1.jpg through FILE6.jpg are used as the displays for the icon images 2-1 through 2-6. Further, the icon images 3-1 and 3-2 indicate the directories DIR1 and DIR2, respectively. Borders 3-3, 3-4 are added to these icon images. It should be noted that the thumbnail images of image files having the latest creation dates among the files FILE7.jbg, FILE8.jbg, FILE9.jbg and FILE10.jbg under respective ones of the icon images 3-1, 3-2 are used as these icon images. When DIR1 is opened, a window is displayed and the image files belonging to the directory "DIR1" are displayed in this window. The thumbnail image used for the icon image 3-1 is the thumbnail image of the image file having the latest creation date among these image files. In this example the icon image 3-3 is used. Further, the directory path name DIR-A is displayed as the title of the window 1.

Figure 6:
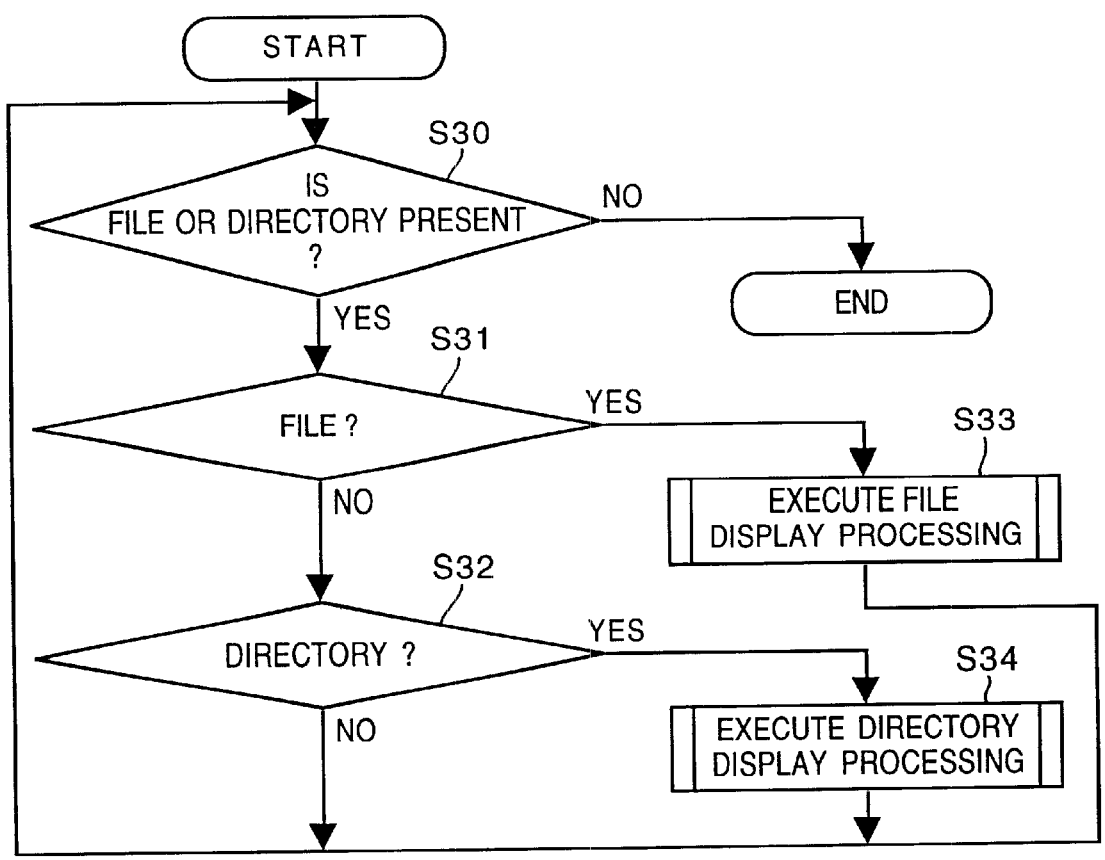
FIG. 6 is a flowchart illustrating a file display procedure of one directory according to the first embodiment.

A processing procedure for presenting the display set forth above will now be described with reference to the flowchart of FIG. 6. When the user enters a command (from the input unit 160) to display the files stored under the directory DIR-A, the processing according to the flowchart of FIG. 6 is executed.

Whether an image file or a directory is present in an entered directory name (e.g. "DIR-1") is determined at step S30 by searching the file system having the data structure shown in FIG. 4. If an image file or directory is present, the program proceeds to step S31. If there is no file or directory, processing is terminated.

One file (or directory) not yet being displayed under the entered directory name is chosen and it is determined whether this indicates an ordinary image file at step S31. If the file is an ordinary image file, the program branches to step S33. If the file is not an ordinary image file, then the program proceeds to step S32. A thumbnail image of the corresponding image file is generated and displayed on the display 122 at step S33. The program then returns to step S30, at which the processing described above is repeated. The details of file display processing executed at step S33 will be described later with reference to the flowchart of FIG. 7.

It is determined at step S32 whether the chosen file (or directory) indicates a directory. In case of a directory, the program branches to step S34; otherwise, the program returns to step S30 and processing the same as that described is executed. Directory display processing is executed at step S34, the program returns to step S30 and the same processing is executed. The detailed procedure of directory display processing executed at step S34 will be described later with reference to FIG. 9.

Thus, the same processing is executed until the display of all files (or directories) under the designated directory name (e.g. "DIR-A") is completed.

The processing of FIG. 6 set forth above will now be described with reference to a specific example. The decision processing of steps S30~S32 is merely for determining whether an entered data string is indicative of an ordinary file or directory. Accordingly, this decision processing can be carried out merely by examining the file attributes indicated by the data string.

In the example of the directory structure shown in FIG. 4, first FILE1.jpg is displayed. Since FILE1.jpg is an ordinary file, the "FILE" decision is rendered at step S31 in FIG. 6, the program proceeds to step S33 and FILE1.jpg is displayed. The same operation is performed with regard to the succeeding files FILE2.jpg, FILE3.jpg.

Next, in a case where "DIR-1" is displayed, the program proceeds from step S31 to step S32, the "DIRECTORY" decision is rendered and the program branches to step S34. Processing for displaying this directory is then executed. Similar processing is executed also with regard to the final "DIR-2".

The detailed procedure of the image file display processing executed at step S33 will now be described with reference to the flowchart of FIG. 7.

Figure 7:
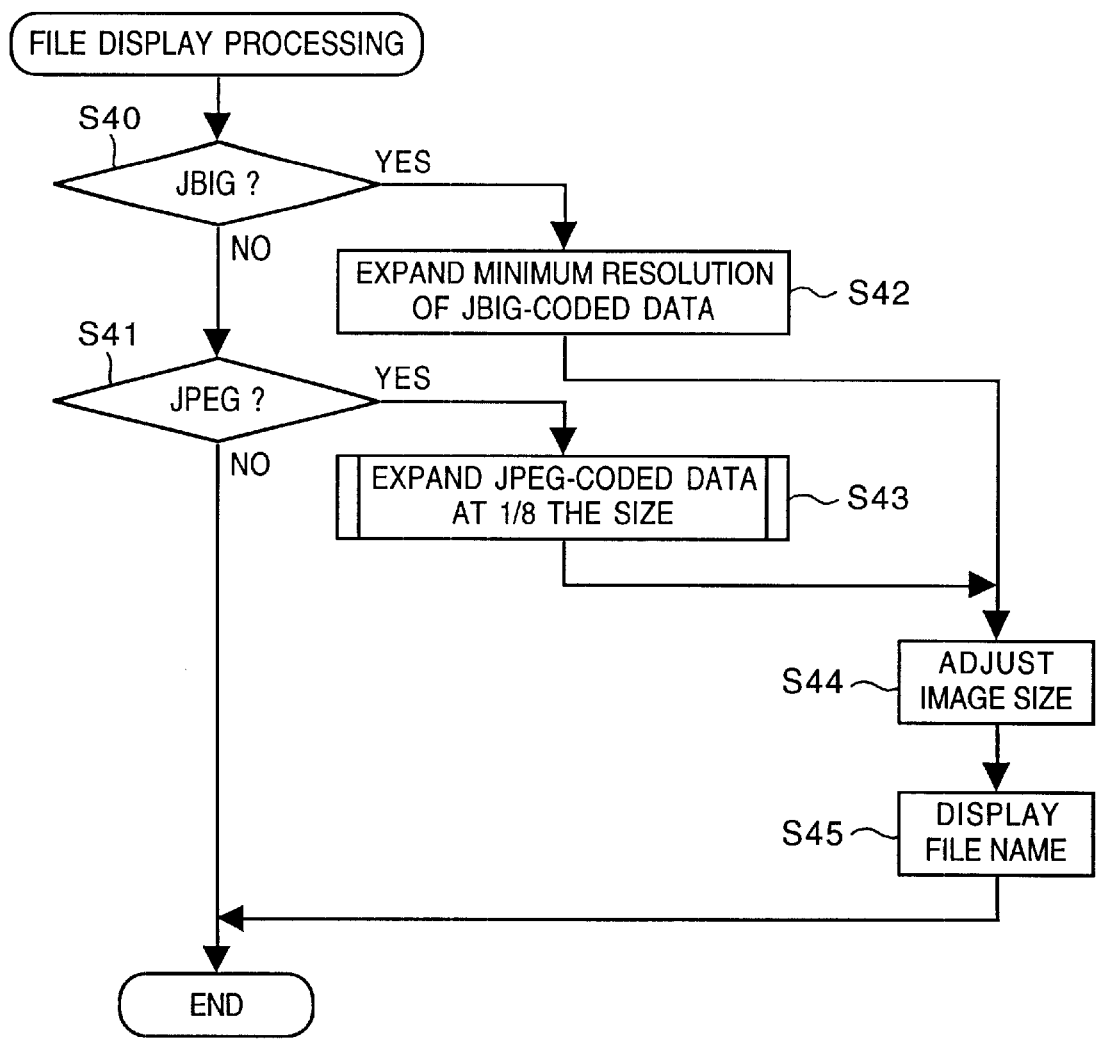
FIG. 7 is a flowchart illustrating the procedure of image file display processing according to the first embodiment.

According to the processing of FIG. 7, it is determined whether an image file is JBIG-coded data or JPEG-coded data, the corresponding decoding processing is executed and image data for display is created.

It is determined at steps S40 and S41 in FIG. 7 whether the file is JBIG-coded data or JPEG-coded data. Since the extension ".jpg" has been attached to an image file coded by JPEG coding and ".jbg" to an image file coded by JBIG coding, the decisions of steps S40, S41 can be rendered in simple fashion. In case of JBIG-coded data, a "YES" decision is rendered at step S40 so that the program proceeds to step S42. Here JBIG-coded data having the lowest resolution is read out and decoding processing is executed to obtain a thumbnail image.

In case of JPEG-coded data, a "YES" decision is rendered at step S41 so that the program proceeds to step S43. Here decoding processing of image data of ⅛ the size in the X and Y directions is executed using JPEG hierarchical decoding processing, whereby a thumbnail image is obtained.

Figure 8:
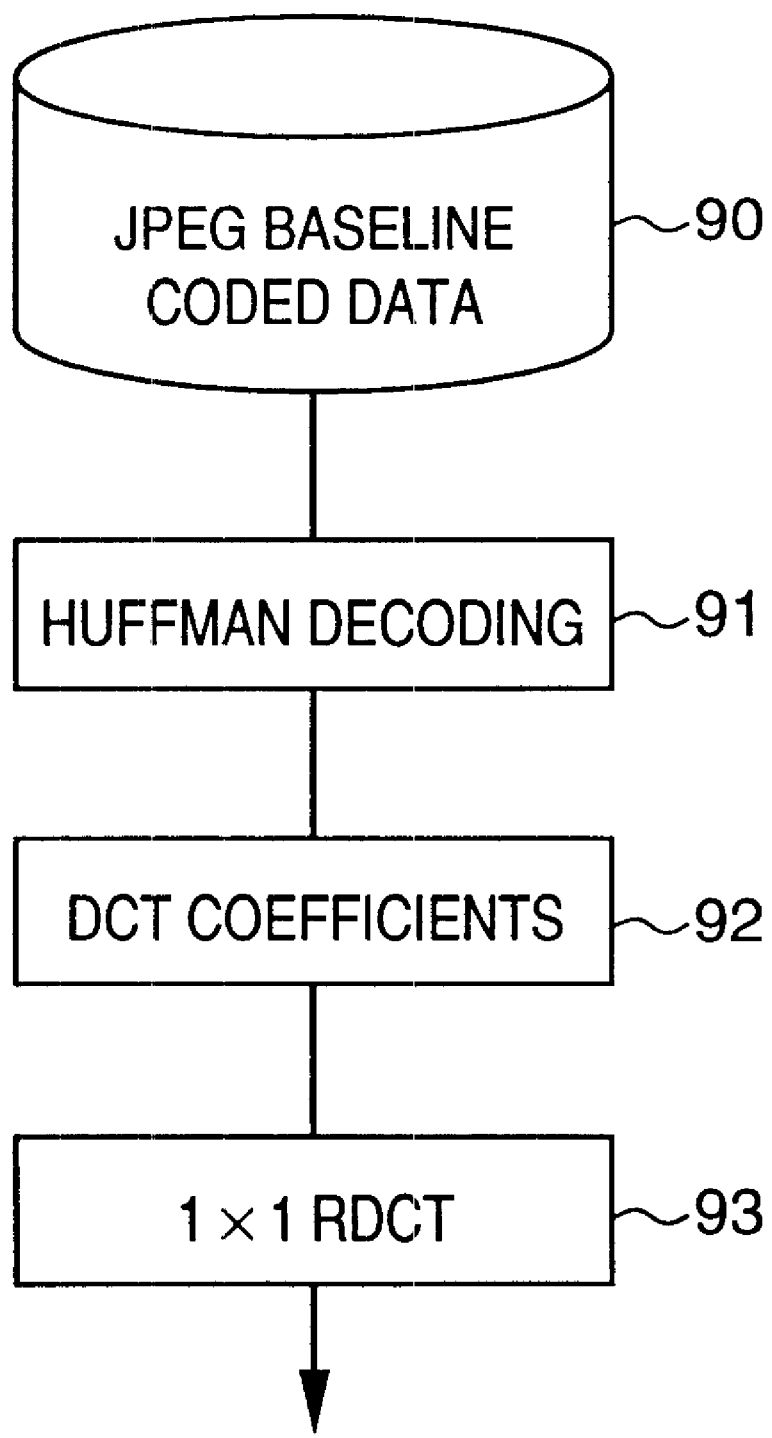
FIG. 8 is a diagram useful in describing processing for expanding JPEG-encoded data to a size which is ⅛ of the original.

Decoding processing for ⅛ the size according to the JPEG method will be described with reference to FIG. 8. Ordinary JPEG-coded data is shown at 90 in FIG. 8. By subjecting this data to ordinary Huffman decoding processing (91), a matrix of 8×8 DCT coefficients 92 is obtained. By subjecting these DCT coefficients to 1×1 reverse DCT processing (93), an image having ⅛ the size in both the X and Y directions is restored. In other words, only the DC (direct current) components among the DCT coefficients are decoded to obtain a thumbnail image reduced to ⅛ the size.

Next, at step S44 in FIG. 7, processing is executed to adjust the image size in such a manner that the image data decoded at step S42 or S43 will take on a size suitable for the search image display (e.g. the size of the icon images 2-1~2-6). This processing is such that if the size of image data obtained by decoding is larger than the icon image size shown in FIG. 5, reduction processing is applied to the image data in such a manner that the latter size will be obtained. On the other hand, if the size of image data obtained by decoding is smaller than the icon image size, enlargement processing is applied to the image data. As a result, even if the sizes of the original images are different, the icon images displayed as shown in FIG. 5 can be displayed so as to have the same size.

It should be noted that one having ordinary skill in the art can select well-known subsampling processing or interpolation processing as the above-mentioned reduction processing and enlargement processing.

After a search display image has been displayed in the window, the file name of this image file is displayed at step S45.

The details of file display processing according to step S33 have been described. Next, the details of the procedure for directory display processing executed at step S34 in FIG. 6 will be described with reference to the flowchart of FIG. 9.

A directory icon is displayed at step S50. According to this embodiment, an icon having a border of the kind indicated at icon images 3-1 and 3-2 in FIG. 5 is displayed. This is followed by step S51, at which it is determined whether image files exist under this displayed directory. If it is found that there are no image files, then the program proceeds to step S54, where the name of the directory is displayed. In this case a display of a thumbnail image is not presented. Conversely, if image files do exist under the displayed directory, the program proceeds to step S52. Here one thumbnail image of an image file under the directory is displayed. According to this embodiment, the latest image file is selected and the thumbnail image of this file is displayed, as mentioned earlier. This is followed by step S53, at which the first file of the adjusted size in the directory is displayed in the directory icon, and then by step S54, at which the directory name (e.g. DIR1, etc.) is displayed.

In this embodiment, it is possible to assign image files that continuously enter from a scanner or the like to a directory having a "book" attribute. As a result, continuously entered image files can be stored in one directory, thereby facilitating management of the image files. A directory of this kind is indicated by icons 3-3, 3-4 having borders in the manner of the directories DIR1, DIR2 in FIG. 5.

Further, in the case where the directory having the attribute "book" is displayed, an arrangement may be adopted in which the image of the first page is displayed in the directory icon.

The directory icon DIR1 (3-1) in FIG. 5 displays a list of image files that are under the directory in a case where the user has designated the display of the files that are under this directory. In other words, the file display processing described in FIG. 7 is executed and the size-adjusted thumbnail images are displayed in the manner shown in window 2 in FIG. 5. Here 3-3 represents the image of the first page indicated in the icon of directory 3-1, and 3-4 represents the image of the second page.

The path name DIR-A/DIR1 is displayed in the title of the window 2. Furthermore, it is possible to display the details of the image files as well.

The detailed image of FILE7.jbg of window 2 in FIG. 5 or the full-size image can be displayed in the following manner: Specifically, in a case where the user has designated display of FILE7.jbg of window 2, the window 3 is opened, the corresponding detailed image is displayed, as shown in FIG. 5, and the path name+file name "DIR-A/DIR1/FILE7.jbg is displayed as the title.

The procedure through which a designated image file is displayed in full size will now be described.

<Processing for displaying JBIG-coded image>

Figure 10:
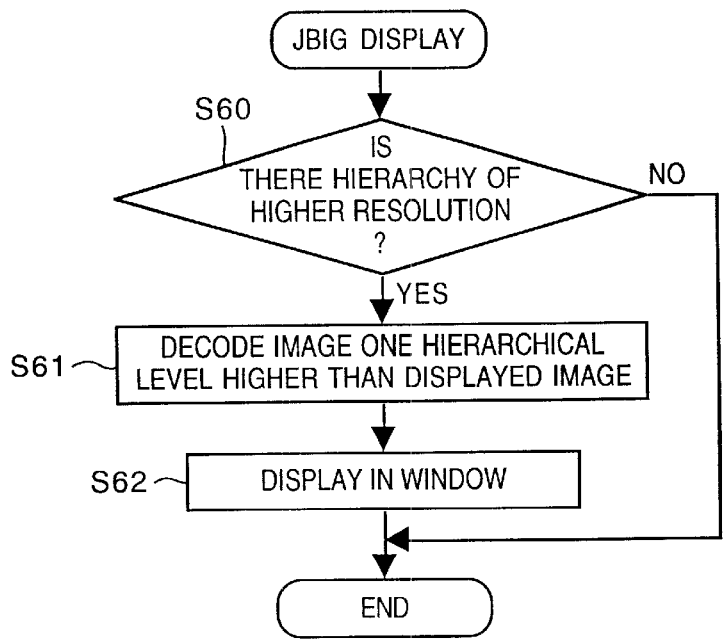
FIG. 10 is a flowchart illustrating JBIG hierarchical code display processing according to the first embodiment.

In the case where JBIG coding is used to code an image, the coded image is constituted by a hierarchical code and is decoded/displayed through the processing procedure shown in FIG. 10. For a desired image file, a command requesting display of a high-resolution image of the directory is entered from the input unit 160. If the designated image file has been coded by JBIG coding, processing shifts to step S60 in FIG. 10. According to this embodiment, designating an icon image issues the command requesting the highresolution image display of the coded image data corresponding to this icon image and causes execution of the processing of FIG. 10.

It is determined at step S60 whether a desired image file has a hierarchical image of a higher resolution. If the answer is "YES", the program proceeds to step S61. If the answer is "NO", then processing is terminated. This is followed by step S61, at which the image one hierarchical level higher than the resolution of the image currently being displayed is decoded.

Next, at step S62, the decoded image is displayed in the window. An example of this display is indicated in window 3 of FIG. 5.

The foregoing processing is executed whenever a corresponding thumbnail image is designated. Accordingly, by repeatedly designating a thumbnail image, the decoding level of the thumbnail image rises and gradually approaches the original image. For instance, in the example of FIG. 5, the decoding level of the image displayed in window 3 rises whenever the icon image 3-3 is designated and the complete decoded image is finally displayed after designating the icon image a certain number of times.

<Processing for displaying JPEG-coded image>

Figure 11:
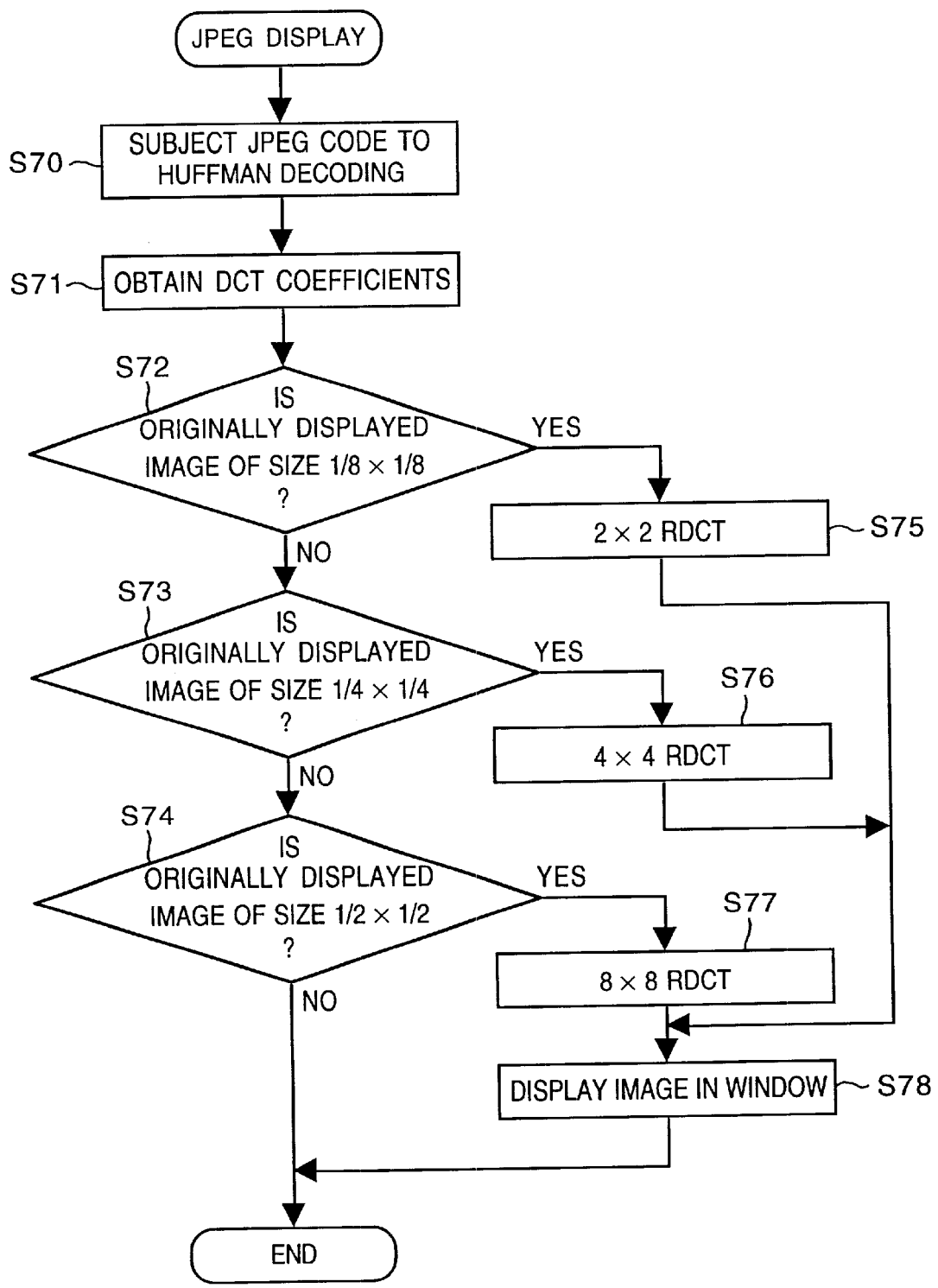
FIG. 11 is a flowchart illustrating JPEG display processing according to the first embodiment.

On the other hand, in a case where an image file designated for full-size display of the image has been coded by the JPEG method, display processing indicated by the flowchart of FIG. 11 is executed whenever the icon image is designated.

The JPEG code is subjected to reverse DCT (RDCT) Huffman decoding at steps S70, S71 to obtain DCT coefficients. This is followed by steps S72, S73 and S74 at which the size of the image currently being displayed is designated and RDCT of a size greater than the current size is executed to obtain a detailed image.

For example, in a case where the currently displayed image is an icon image, i.e., an image of size $\frac{1}{8} \times \frac{1}{8}$, the thumbnail image has been decoded by 1×1 RDCT processing. As a result, 2×2 RDCT processing (step S75) is executed and an image of size $\frac{1}{4} \times \frac{1}{4}$ is obtained. The image obtained is then displayed in the image display window at step S78.

If an image is already being displayed in the image display window, it is determined whether the displayed image is of size $\frac{1}{4} \times \frac{1}{4}$ or $\frac{1}{2} \times \frac{1}{2}$. If the displayed image is of size $\frac{1}{4} \times \frac{1}{4}$, the program proceeds to step S76, 4×4 RDCT processing is executed and an image of size $\frac{1}{2} \times \frac{1}{2}$ is obtained. The image obtained is then displayed in the image display window at step S78. If image currently being displayed in the image display window is of size $\frac{1}{2} \times \frac{1}{2}$, the program proceeds to step S77, an image of size 1×1 is generated and the image is displayed in the image display window. It should be noted that this image display window is displayed in the manner of window 3 in FIG. 5.

[Second Embodiment]

Retrieval and display of image files of a directory structure stored in the magnetic disk 130 has been described in the first embodiment. Since absolutely no additional data other than the data of the ordinary directory structure is generated, the present invention can be implemented in similar fashion also with regard to a storage device that cannot be written, such as the CD-ROM drive 150. In other words, if an image file having a directory structure stored on a CD-ROM possesses a file structure of the kind shown in FIG. 4, the content of the CD-ROM can be searched/displayed in the same manner as set forth in the first embodiment.

[Third Embodiment]

It is described in the first embodiment that an icon and directory name are displayed in a case where a directory is displayed. In the third embodiment, a case is described in which, when a directory is displayed, an icon, the directory name and the number of files arrayed under the directory are displayed.

Figure 9:
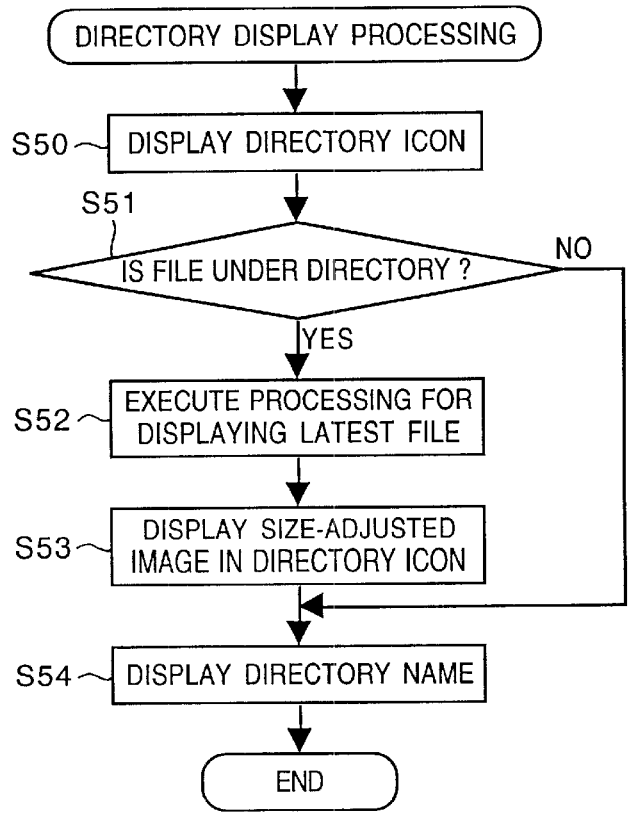
FIG. 9 is a flowchart of directory display processing according to the first embodiment.

The operation of the third embodiment will be described with reference to the flowchart of FIG. 12. Steps S50 and S54 in FIG. 12 represent processing identical with that of steps S50 and S54 of the first embodiment (FIG. 9). That is, if a directory is displayed, the processing for displaying a directory icon and the directory name is the same as that described in the first embodiment. According to the third embodiment, these steps are preceded by an additional step S90, which is processing for counting the number of files disposed under the directory and displaying the number.

More specifically, at step S90, a file (not shown) which manages the directory is opened, the content of the directory is read out in accordance with the format of directory management and the number of JPEG-coded files and JBIG-coded files being managed by this directory are counted. The number of these files is displayed at the same time as the directory icon.

A case in which the results of search processing as by a keyword search, for example, will be considered as a modification of this embodiment. Here a case will be described in which the items of information obtained as the results of a keyword search are the file names of the full path with the directory names attached, as shown in FIG. 13. To facilitate an understanding of this embodiment, it will be assumed that six image files have been retrieved from the files of the directory structure shown in FIG. 4.

The procedure for displaying the retrieved images will be described with reference to FIG. 14.

Figure 14:
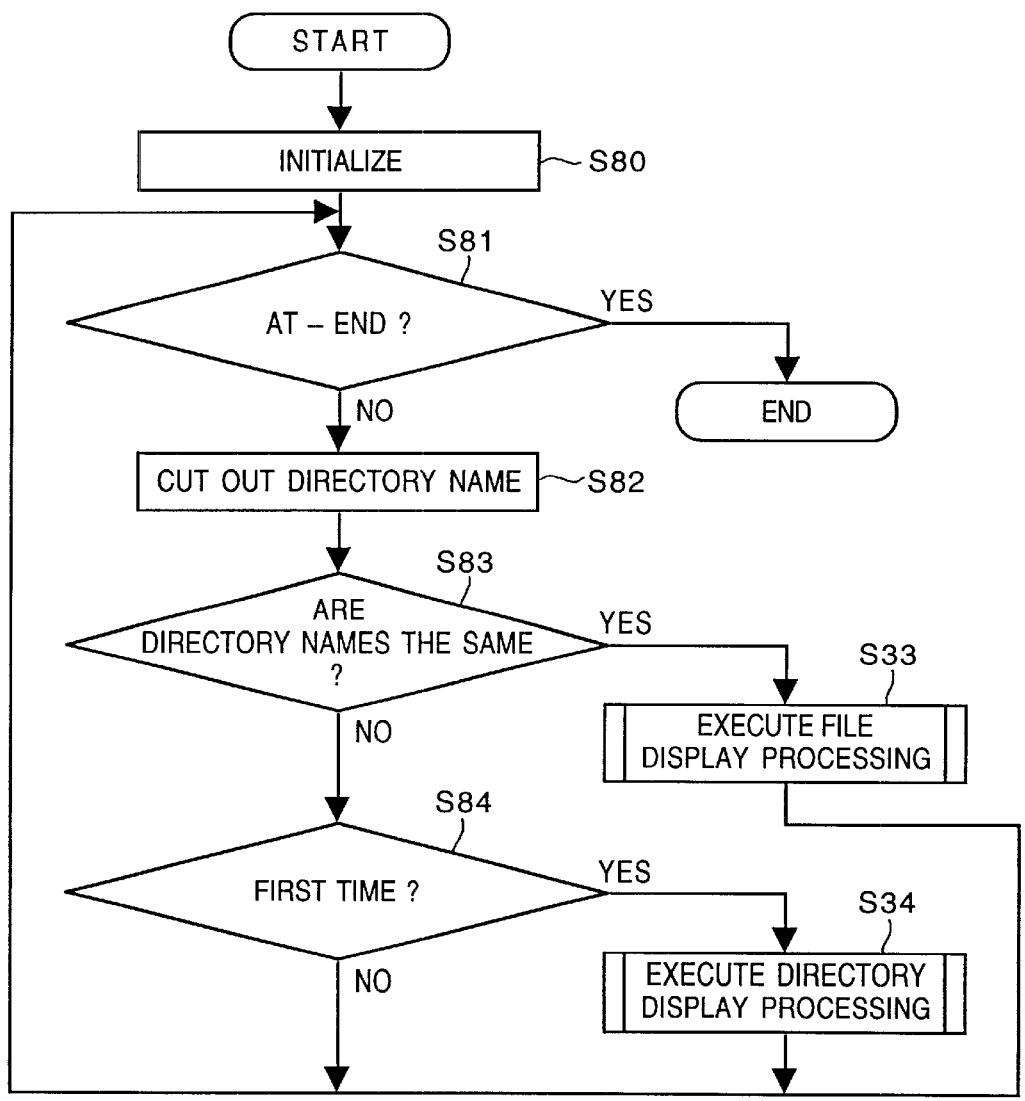
FIG. 14 is a flowchart showing an information processing procedure according to the third embodiment.

Initialization processing is executed at step S80 in FIG. 14. For example, the area which stores the immediately preceding directory name is cleared for the purpose of comparing directory names. Further, it may be arranged to execute processing for extracting the directory name from the file name of the full path stored at the beginning of the search results and opening the window of this directory. Next, at step S81, it is determined whether all processing relating to the search results has been completed. Processing is terminated if the answer is "YES". If processing is still in progress, then the program proceeds to step S82.

At step S82 the directory name is extracted from the file name stored in the full path of the search results. It is determined at step S83 whether the directory name that has been extracted is the same as the directory name currently being displayed. If they are the same, the program proceeds to step S33 so that a transition is made to processing for displaying the retrieved image data. If the directory names are found not to be the same at step S83, then the program proceeds to step S84. Here it is determined whether another directory name is already being displayed. If another directory name is not being displayed, the program proceeds to step S34, where processing for displaying the directory is executed.

An instance in which the foregoing processing is executed with regard to the data shown in FIG. 13 will be described. It will be assumed that the window for DIR-A is currently being displayed. Alternatively, it will be assumed that the window "DIR-A" has been opened from the starting file name "DIR-A/FILE1.jpg" by the processing of step S80. First, with regard to the initial "DIR-A/FILE1.jpg", this directory name becomes "DIR-A" at step S82 so that directory now displayed becomes "DIR-A".

Since DIR-A is the window currently being displayed, the program branches at step S83 and processing proceeds to step S33, where processing for displaying FILE1.jpg is executed. Since the directory is DIR-A also for the succeeding "DIR-A/FILE2.jpg" and "DIR-A/FILE4.jpg", processing for displaying the retrieved images is executed in the same manner as set forth above.

In the case of "DIR-A/DIR1/FILE7.jbg", the directory name becomes "DIR-A/DIR1" at step S82. Since this is different from the directory name (DIR-A) now being displayed, processing proceeds to step S34 via step S84 so that the directory is displayed.

Directory display processing is executed in similar fashion with regard to "DIR-A/DIR2.FILE9.jbg". Further, directory display processing is executed in similar fashion with regard to "DIR-A/DIR2/FILE9.jbg. In case of "DIR-A/DIR2/FILE.10jbg", processing proceeds to step S84. However, since "DIR2" is being displayed, processing returns to step S81 without a new display being presented.

Thus, in accordance with the third embodiment, the number of files being managed by a directory can be ascertained and file retrieval efficiency can be improved.

In each embodiment illustrated above, it is described that JBIG coding is used for monochrome bi-level images and JPEG coding for color images. However, it goes without saying that the present invention is not limited to these coding methods and may be implemented with other coding methods as well.

Further, with regard to JPEG coding, it is described that a retrieved display image is reproduced by JPEG hierarchical decoding. However, ordinary JPEG decoding may be employed as well. In such case it goes without saying that reduction processing for displaying results of retrieval would be executed after the original image has been reproduced.

Further, it has been described that a directory icon is displayed in case of a directory. However, the present invention is not limited to such an arrangement.

The present invention is not limited to the illustrated screen layout for displaying results of retrieval.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system (OS) or the like working on the computer performs a part of or the entire process in accordance with the designation of program codes and implements the functions according to the embodiments.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Figure 15:
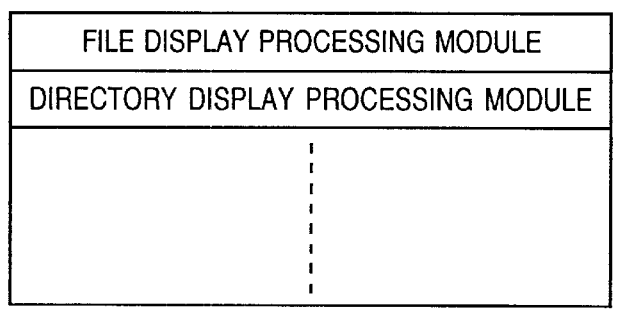
FIG. 15 is a diagram showing the layout of program modules stored on a prescribed recording medium capable of being read by a computer.

In a case where the present invention is applied to the above-mentioned storage medium, program codes corresponding to the flowcharts described earlier are stored on the storage medium. More specifically, the modules shown in the example of the memory map of FIG. 15 are stored on the storage medium.

That it is, it will suffice to store the program codes of at least the following modules on the storage medium: a "file display module" for displaying thumbnail images of files (image data) that belong to a prescribed directory, and a "directory display module" for displaying a thumbnail image of one file (one item of image data) belonging to another directory that belongs to the prescribed directory.

In accordance with each of the embodiments as described above, displaying image files having a directory structure makes it possible to retrieve the images in accordance with the directory structure so that the efficiency of image retrieval can be improved.

Further, by displaying retrieved images as thumbnail images per each directory, image decoding time is shortened.

Furthermore, by decoding and displaying only a desired image as a detailed image or original image, a further improvement in image retrieval efficiency can be achieved.

Thus, in accordance with the present invention as described above, retrieval of prescribed images from among a plurality of images can be performed simply and at high speed.

As many apparently widely different embodiments of the present invention can be made without departing from the spirit and scope thereof, it is to be understood that the invention is not limited to the specific embodiments thereof except as defined in the appended claims.

What is claimed is:

1. An information processing method for managing image data files by a file system having a hierarchical tree structure in which directories and files are placed under another directory, comprising:
   a first generating step of, generating a thumbnail image on a basis of each image data file that is placed under a desired directory;
   a first display step of, displaying the thumbnail image generated in said first generating step as an icon for an image data file;
   a second generating step of, when a second directory is placed under the desired directory, selecting one image data file from one or more image data files placed under the second directory and generating a thumbnail image on a basis of the selected image data file; and
   a second display step, of displaying the thumbnail image generated in said second generating step as an icon for the second directory together with the thumbnail image displayed in the first display step, the icon for the second directory being distinguishable from the icon for an image data file displayed in the first display step.

2. The method according to claim 1, wherein said first and second display steps display the thumbnail images in a first window.

3. The method according to claim 1, further comprising a third display step which, in a case where a thumbnail image displayed at said first display step has been designated, is a step of displaying, in a second window, a full-size image of the image data file that is the source of the thumbnail image that has been designated.

4. The method according to claim 1, further comprising an execution step which, in a case where the thumbnail image displayed at said second display step has been designated, is a step of executing said first generating step, said first display step, said second generating step and said second display step with regard to a directory that corresponds to the thumbnail image that has been designated.

5. The method according to claim 4, wherein said execution step causes display of the thumbnail images in said first and second display steps to be performed in a different window for every directory of interest.

6. The method according to claim 1, wherein the image data is JPEG-coded image data.

7. The method according to claim 1, wherein the image data is JBIG-coded image data.

8. The method according to claim 1, wherein the image data files are coded image data capable of being decoded in multiple stages, and said first generating step adopts an image, which is obtained by decoding the coded image data at a lower level, as a thumbnail image.

9. The method according to claim 8, further comprising a size correcting step of enlarging and reducing size of a thumbnail image obtained in said first generating step to a size suitable for display in said first display step.

10. The method according to claim 8, further comprising a third display step which, in a case where a thumbnail image displayed in the first display step has been designated, is a step of decoding, at a decoding level higher than the decoding level of said thumbnail image, coded image data that is the source of thumbnail image that has been designated, and displaying, in a second window, the image that has been obtained.

11. The method according to claim 10, further comprising an updating step which, in a case where a thumbnail image for which the image is already being displayed in the second window in said third display step has been further designated, is a step of decoding the coded data of said thumbnail image at a decoding level still higher than the decoding level of the image being displayed in the second window, and updating display of the second window using the image that has been obtained.

12. An information processing apparatus for managing image data files by a file system having a hierarchical tree structure in which directories and files are placed under another directory, comprising:
   first generating means for generating a thumbnail image on a basis of each image data file that is placed under a desired directory;
   first display means for displaying the thumbnail image generated by said first generating means as an icon for an image data file;
   a second generating means for, when a second directory is placed under said desired directory, selecting one image data file from one or more image data files placed under the second directory and generating a thumbnail image on a basis of the selected image data file; and
   a second display means for displaying the thumbnail image generated by said second generating means as an icon for another directory together with the thumbnail image displayed by said first display means, the icon for the second directory being distinguishable from the icon for an image data file displayed by said first display means.

13. The apparatus according to claim 12, wherein said first and second display means display the thumbnail images in a first window.

14. The apparatus according to claim 12, further comprising third display means which, in a case where a thumbnail image displayed by said first display means has been designated, is for displaying, in a second window, a full-size image of the image data file that is the source of the thumbnail image that has been designated.

15. The apparatus according to claim 12, further comprising execution means which, in a case where the thumbnail image displayed by said second display means has been designated, is for executing said first generating means, said first display means, said second generating means and said second display means with regard to a directory that corresponds to the thumbnail image that has been designated.

16. The apparatus according to claim 15, wherein said execution means causes display of the thumbnail images by said first and second display means to be performed in a different window for every directory of interest.

17. The apparatus according to claim 12, wherein the image data is JPEG-coded image data.

18. The apparatus according to claim 12, wherein the image data is JBIG-coded image data.

19. The apparatus according to claim 12, wherein the image data files are coded image data capable of being decoded in multiple stages, and said first generating means adopts an image, which is obtained by decoding the coded image data at a lower level, as a thumbnail image.

20. The apparatus according to claim 19, further comprising size correcting means for enlarging and reducing size of a thumbnail image obtained by said first generating means to a size suitable for display by said first display means.

21. The apparatus according to claim 19, further comprising third display means which, in a case where a thumbnail image displayed by the first display means has been designated, is for decoding, at a decoding level higher than the decoding level of said thumbnail image, coded image data that is the source of thumbnail image that has been designated, and displaying, in a second window, the image that has been obtained.

22. The apparatus according to claim 21, further comprising updating means which, in a case where a thumbnail image for which the image is already being displayed in the second window by said third display means has been further designated, is for decoding the coded data of said thumbnail image at a decoding level still higher than the decoding level of the image being displayed in the second window, and for updating display of the second window using the image that has been obtained.

23. A computer readable memory storing a control program for managing image data files by a file system having a hierarchical tree structure in which directories and files are placed under another directory, comprising:

code for a first generating step, of generating a thumbnail image on a basis of each image data file that is placed under a desired directory;

code for a first display step, of displaying the thumbnail image generated in said first generating step as an icon for an image data file;

code for a second generating step, of, when a second directory is placed under the desired directory, selecting one image data file from one or more image data files placed under the second directory and generating a thumbnail image on a basis of the selected image data file; and code for a second display step, of displaying the thumbnail image generated in said second generating step as an icon for the second directory together with the thumbnail image displayed in the first display step, the icon for the second directory being distinguishable from the icon for an image data file displayed in the first display step.

* * * * *